United States Patent
Ragupathi et al.

(10) Patent No.: US 10,255,201 B2
(45) Date of Patent: Apr. 9, 2019

(54) LOCAL KEY MANAGEMENT FOR STORAGE DEVICES

(71) Applicant: DELL PRODUCTS, L.P., Round Rock, TX (US)

(72) Inventors: Dinesh Kunnathur Ragupathi, Round Rock, TX (US); Rama Rao Bisa, Kandukur (IN); Pavan Kumar, Bangalore (IN); Syama Sundar Poluri, Round Rock, TX (US); Sanjeev S. Dambal, Austin, TX (US); Satyajit Dipakbhai Desai, Round Rock, TX (US); Kevin Warren Mundt, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 297 days.

(21) Appl. No.: 15/157,916

(22) Filed: May 18, 2016

(65) Prior Publication Data

US 2017/0337140 A1    Nov. 23, 2017

(51) Int. Cl.
*G06F 12/14* (2006.01)
*G06F 13/42* (2006.01)
(Continued)

(52) U.S. Cl.
CPC ...... *G06F 12/1408* (2013.01); *G06F 13/4282* (2013.01); *G06F 21/60* (2013.01);
(Continued)

(58) Field of Classification Search
CPC .. G06F 12/1408; G06F 13/4282; G06F 21/64; G06F 21/44; G06F 9/44521;
(Continued)

(56) References Cited

U.S. PATENT DOCUMENTS 7,962,763 B2 * 6/2011 Trezise ............... G06F 11/1448
713/189
9,043,613 B2 * 5/2015 Shapiro ............... G06F 12/1408
713/190
(Continued)

OTHER PUBLICATIONS

Mundt, Kenneth W., et al., "System and Method for Monitoring Parameters at a Data Storage Device", U.S. Appl. No. 14/879,728, filed Oct. 9, 2015.

*Primary Examiner* — Jason K Gee
*Assistant Examiner* — Shu C Gao
(74) *Attorney, Agent, or Firm* — Isidore PLLC

(57) ABSTRACT

A method and system provide local key management for storage enclosures. The method includes retrieving first security content from a security vault of a service processor, then dynamically detecting a hardware interface communicatively coupled to the service processor. A data storage device, communicatively coupled to the hardware interface is dynamically detected. A dynamic determination is made as to whether the data storage device is a self-encrypting capable data storage device. In response to the data storage device being a self-encrypting capable data storage device, a second security content is retrieved from the data storage device, and a validation regarding an association between the first security content and the second security content is made. Finally, in response to a positive validation of the association between the first security content and the second security content, security keys are transmitted to the data storage device, and access to the data storage device is enabled.

18 Claims, 10 Drawing Sheets

(51) Int. Cl.
*G06F 21/60* (2013.01)
*G06F 21/78* (2013.01)
*H04L 29/06* (2006.01)
*H04L 29/08* (2006.01)

(52) U.S. Cl.
CPC ............ *G06F 21/602* (2013.01); *G06F 21/78* (2013.01); *H04L 63/0428* (2013.01); *H04L 63/061* (2013.01); *H04L 67/1097* (2013.01); *G06F 2212/1052* (2013.01)

(58) Field of Classification Search
CPC . G06F 17/3033; H04L 63/061; H04L 9/3236; H04L 9/0631
See application file for complete search history.

(56) References Cited

U.S. PATENT DOCUMENTS

| | | | |
|---|---|---|---|
| 9,076,018 B2 * | 7/2015 | Johnson | G06F 21/00 |
| 9,176,896 B2 * | 11/2015 | Baryudin | G06F 12/1408 |
| 9,201,833 B2 * | 12/2015 | Dhandapani | G06F 13/102 |
| 9,436,834 B1 * | 9/2016 | Tang | G06F 21/602 |
| 9,684,593 B1 * | 6/2017 | Chen | G06F 12/128 |
| 9,768,952 B1 * | 9/2017 | Allo | H04L 9/083 |
| 9,921,978 B1 * | 3/2018 | Chan | G06F 3/0622 |
| 2014/0020083 A1 * | 1/2014 | Fetik | G06F 21/552 726/11 |
| 2014/0130188 A1 * | 5/2014 | Baryudin | G06F 21/78 726/29 |
| 2015/0324304 A1 * | 11/2015 | Baryudin | G06F 21/78 726/17 |

* cited by examiner

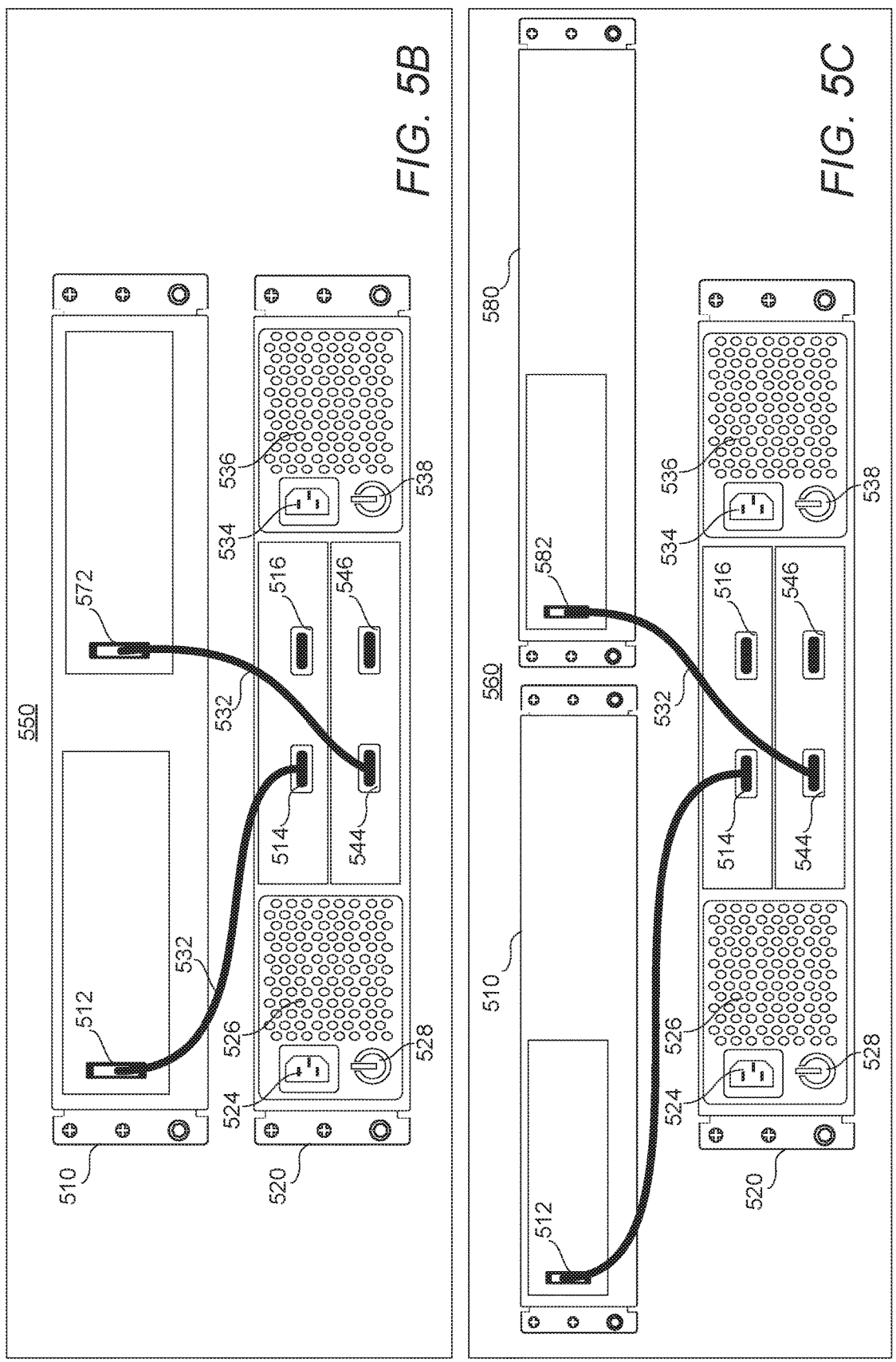

LOCAL KEY MANAGEMENT FOR STORAGE DEVICES

TECHNICAL FIELD

The present disclosure generally relates to an information handling system and in particular to local key management setup in an information handling system.

DESCRIPTION OF THE RELATED ART

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may utilize local key management setup for securing storage devices. However, current local key management setups have inherent problems. These problems include the requirement for a specific parent controller and/or storage topology. Additionally, customers that desire to utilize a local key management setup are hindered by system vendor dependency issues.

BRIEF SUMMARY

Disclosed are a computer-implemented method and an information handling system (IHS) for local key management of storage devices. The method includes retrieving a first security content from a security vault of a service processor, then dynamically detecting one of a backplane controller interface and a host bus adapter interface communicatively coupled to the service processor. The method includes dynamically detecting a data storage device communicatively coupled to one of the backplane controller interface and host bus adapter interface. In response to detecting the data storage device, a determination is made as to whether the data storage device is a self-encrypting capable data storage device. In response to the data storage device being a self-encrypting capable data storage device, a second security content is retrieved from the data storage device, and a validation regarding an association between the first security content and the second security content is made. Finally, in response to a positive validation of the association between the first security content and the second security content, one or more security keys are transmitted to the data storage device via one of the backplane controller interface and the host bus adapter interface, and access to the data storage device is enabled.

Additionally, in response to detecting the backplane controller interface, the first security content is stored in one or more storage registers. The storage registers are located within a microcontroller which is communicatively coupled to the backplane controller interface.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5B illustrates an information handling system with one or more host bus adapter interfaces communicatively coupled to a storage device, in accordance with one embodiment;

FIG. 5C illustrates one or more information handling systems communicatively coupled to a storage device, in accordance with one embodiment;

DETAILED DESCRIPTION

Figure 1:
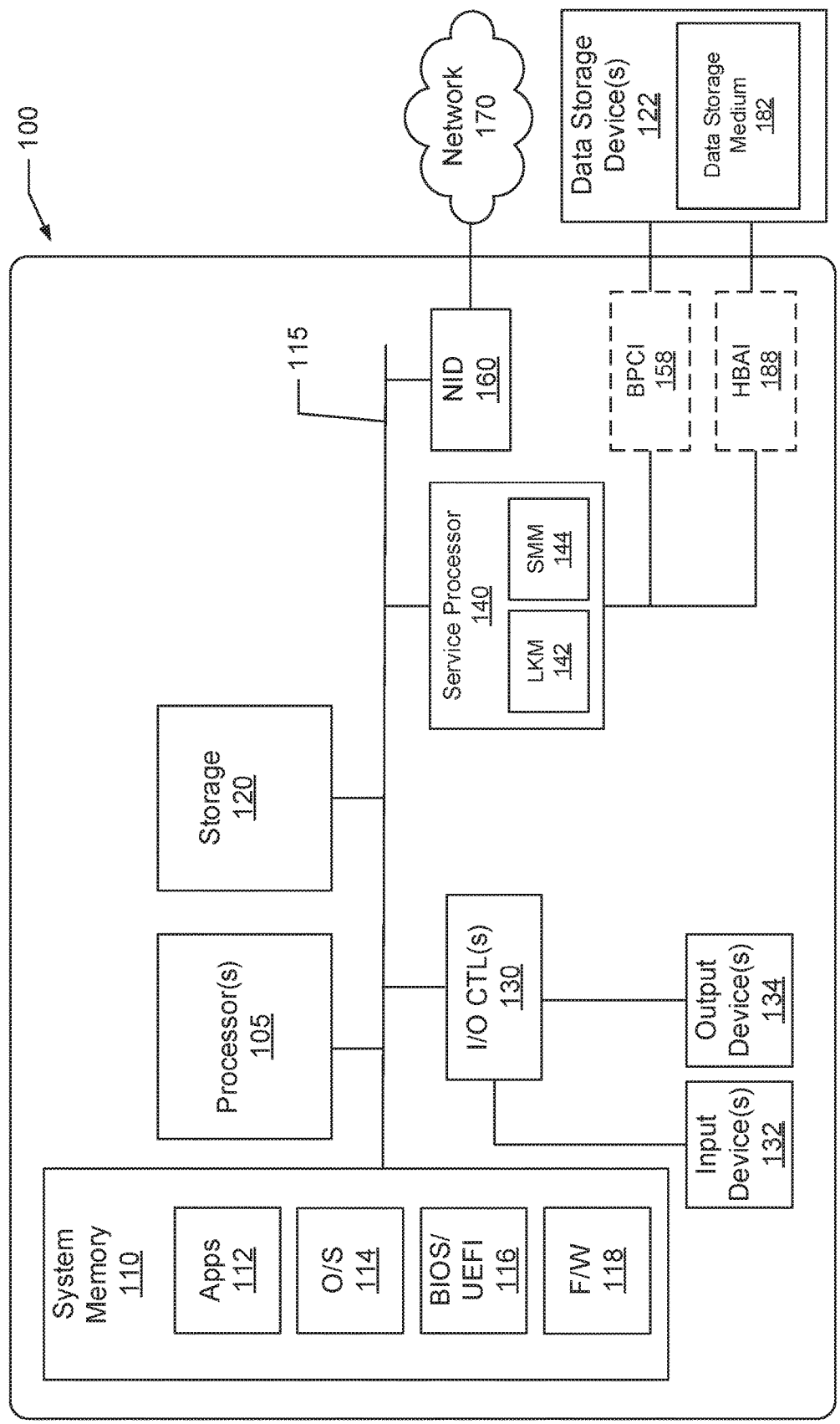
FIG. 1 illustrates an example information handling system having a service processor within which various aspects of the disclosure can be implemented, according to one or more embodiments.

The illustrative embodiments provide an information handling system (IHS) and a method for local key management of storage devices. The method includes retrieving a first security content from a security vault of a service processor, then dynamically detecting one of a backplane controller interface and a host bus adapter interface communicatively coupled to the service processor. A data storage device communicatively coupled to one of the backplane controller interface and host bus adapter interface is dynamically detected. In response to detecting the data storage device, a dynamic determination is made as to whether the data storage device is a self-encrypting capable data storage device. In response to the data storage device being a self-encrypting capable data storage device, a second security content is retrieved from the data storage device, and a validation regarding an association between the first security content and the second security content is made. Finally, in response to a positive validation of the association between the first security content and the second security content, one or more security keys are transmitted to the data storage device via one of the backplane controller interface and the host bus adapter interface, and access to the data storage device is enabled.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software utility, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system/unified extensible firmware interface (BIOS/

UEFI) 116 and other firmware (F/W) 118. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s).

IHS 100 further comprises a network interface device (NID) 160. NID 160 enables IHS 100 to communicate and/or interface with other devices, services, and components that are located external (remote) to IHS 100. These devices, services, and components can interface with IHS 100 via an external network, such as example network 170, using one or more communication protocols. In one embodiment, a customer provisioned system/platform comprises multiple devices located across a distributed network, and NID 160 enables IHS 100 to be connected to these other devices. Network 170 can be a local area network, wide area network, personal area network, and the like, and the connection to and/or between network and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Additionally, service processor 140, of IHS 100, includes local key management (LKM) 142 and security management module (SMM) 144. Service processor 140 may communicate with an external device or network, for example data storage device(s) 122 and network 170. Data storage device(s) 122 can be any storage or group of storage devices (e.g. storage devices within an enclosure) that enable access to data storage medium, such as data storage medium 182. In one embodiment, communication between service processor and data storage device 122 is provided via backplane controller interface (BPCI) 158. In another embodiment, communication with data storage device 122 is provided via host bus adapter interface (HBAI) 188. In yet another embodiment, communication between service processor and data storage device 122 is provided via HBAI 188 when HBAI 188 is connected to BPCI 158. In one embodiment, service processor 140 interfaces with LKM 142 and can update and/or modify the contents of a local key database/security database within LKM 142. LKM 142 and/or any associated security databases may be local and or remote to IHS 100. In one embodiment, LKM 142 generates security content, such as one or more keys and associated certificates, to manage accessibility to secure storage device 122, and LKM 142 stores the generated keys and certificates on a local and/or remote security database communicatively associated with service processor 140.

In one embodiment, data storage device 122 is initially an unsecure data storage device. Data storage device 122 is communicatively coupled to IHS via one of BPCI 158 and HBAI 188. Data storage device 122 is communicatively coupled to the backplane of IHS following the initialization of service processor 140 (i.e. data storage device 122 is hot-plugged). Service processor 140 dynamically detects data storage device 122. In response to detection of the unsecure data storage device (data storage device 122), a request is received at service processor 140 to secure data storage device 122. The request to secure data storage device 122 can be one or more of: an automatic request stored within service processor 140, an automatic request stored within data storage device 122, a user-input request that is received via a user interface device in communication with service processor 140, a predetermined option saved within LKM 142, and a predetermined option stored within data storage device 122 that dynamically transmits a request for storage device 122 to be secured once storage device 122 is communicatively coupled to IHS 100. The requests to secure data storage device 122 can be pre-selectively applied upon detection of the data storage device based on a policy regarding the level of security required or type of data storage device communicatively coupled to IHS 100. The request to secure data storage device 122 can also be selected in real-time.

In one embodiment, in response to receipt of a command to secure the unsecure data storage device, a first security content is generated. The first security content is a new security content, generated via LKM 142. In one embodiment, generation of the first security content requires additional user-input. In another embodiment, generation of the first security content is fully automated. The first security content is transmitted to and stored at service processor 140. Additionally, a second security content is also generated. The second security content is associated with the first security content to work in a lock and key relationship. The second security content is transmitted to data storage device 122. Data storage device 122 is secured by using the combination of the new security content with the second security content.

In one embodiment, the requests to secure the data storage device is a predetermined automated command. Service processor 140 dynamically detects an unsecure data storage device 122 communicatively coupled to one of BPCI 158 and HBAI 188. In response to receipt of the command to secure the unsecure data storage device, a security key is automatically generated via LKM 142, within service processor 140, and the security key is automatically applied to data storage device 122, thereby securing data storage device 122.

In one embodiment, an interface, from among BPCI 158 and HBAI 188 that are communicatively coupled to service processor 140, is dynamically detected by service processor 140. Data storage device 122 is connected to BPCI 158, and BPCI 158 is connected to HBAI 188. Service processor 140 dynamically queries HBAI 188 utilizing an I2C interface to determine which components/devices are connected to HBAI 188. In response to the query, HBAI 188 provides an inventory of the connected physical components to service processor 140. The connected components may include, but are not limited to including, BPCI 158, data storage devices 122, data storage devices 122 connected to the BPCI 158. Additional aspects of service processor 140 and functionality associated with security manager module 144 are presented within the description of FIGS. 2-9.

Figure 2:
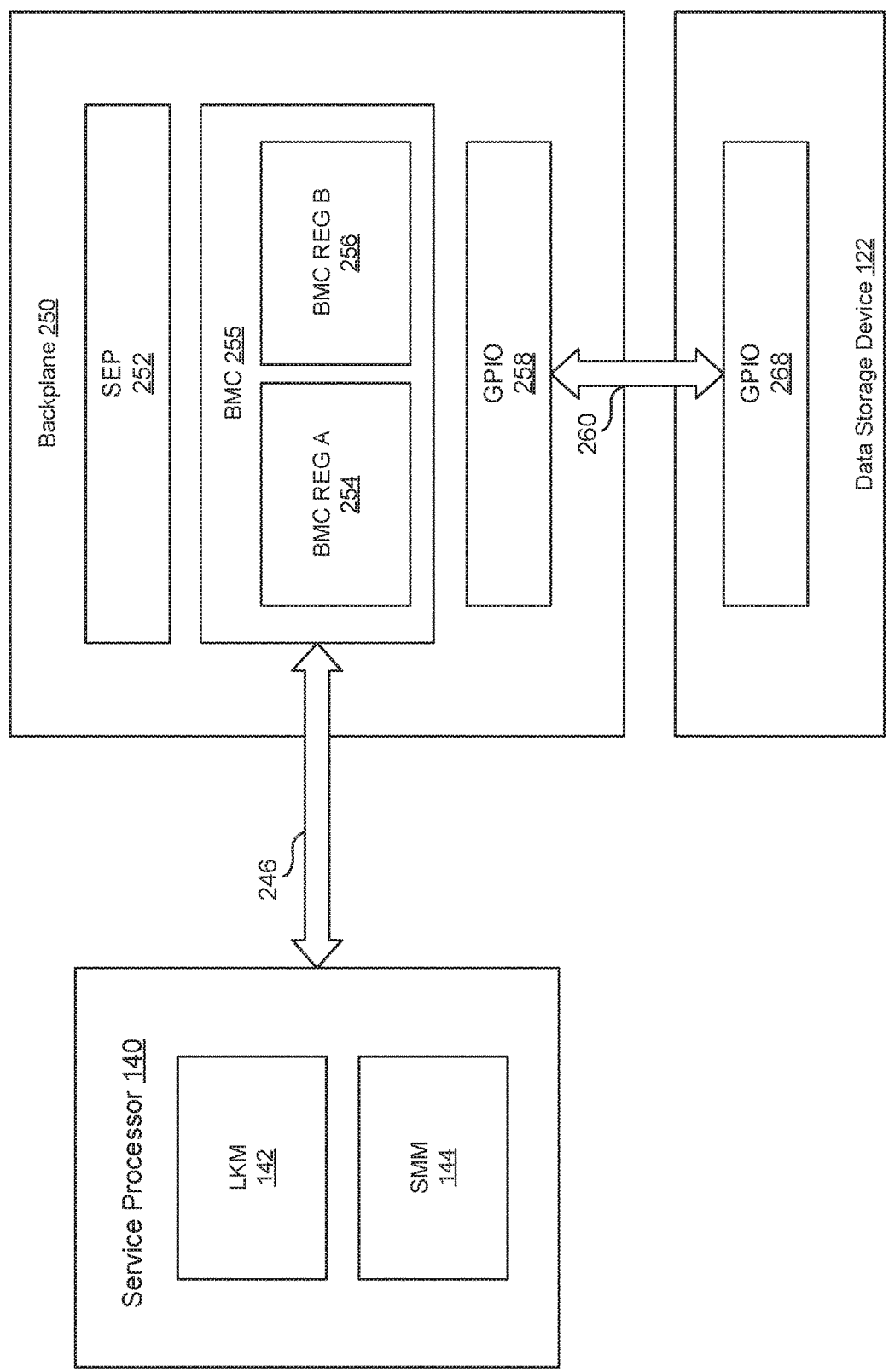
FIG. 2 illustrates example hardware and firmware/software components of FIG. 1 that are utilized for local key management, in accordance with one embodiment.

With reference now to FIG. 2, there is illustrated example hardware and firmware/software components of FIG. 1 that are utilized for local key management of storage devices. Service processor 140 includes software and/or firmware modules, LKM 142 and SMM 144 (of FIG. 1). LKM 142 can also include a local database (not shown) of security content, and LKM 142 is able to communicate with a remote database of security content (via network 170). A communication bus, such as inter-integrated circuit (I2C) bus 246, enables communication and data transmission between service processor 140 and backplane 250. Backplane 250 includes storage enclosure processor (SEP) 252, backplane microcontroller (BMC) 255, and a backplane controller interface, such as backplane general purpose input output (GPIO) 258. Within backplane microcontroller are one or more registers, including, for example, backplane microcontroller register A (BMC REG A) 254 and backplane microcontroller register B (BMC REG B) 256. Additionally, FIG. 2 includes data storage device 122, which is communicatively coupled to a next GPIO, data storage device GPIO 268. Conduit 260 serves as a secure communication conduit for storage devices such as self-encrypting drives (SEDs). Conduit 260 securely transmits information to and from backplane controller 250 and storage device 122.

In one embodiment, during boot-up or booting operations of IHS 100, service processor 140 selectively retrieves security content from security vault 143 associated with LKM 142, which is a module of service processor 140. When service processor 140 dynamically detects that backplane 250 is operational (powered on), the security content is retrieved from the security vault 143 of LKM 142 and sent to backplane microcontroller 255. BMC REG A 254 and BMC REG B 256 store security content received from service processor 140. The security content stored in the registers may include, but is not limited to including, key identifiers and encrypted keys/content to be utilized to secure and/or unlock an associated storage device. In one embodiment, BMC REG A 254 and BMC REG B 256 are volatile registers and the values (or security content) disappear when the power to the device and/or backplane discontinues; thereby avoiding security vulnerability.

In one embodiment, data storage device 122 is dynamically detected by service processor 140. Backplane GPIO 258, a backplane controller interface, is communicatively coupled to backplane 250. Data storage device GPIO 268, a data storage device interface, is communicatively coupled to data storage device 122. Data storage device GPIO 268, of data storage device 122, transmits data to BMC 255 and service processor 140 via backplane GPIO 258. When data storage device 122 is dynamically detected, BMC 255 dynamically determines whether data storage device 122 has self-encrypting drive capabilities. Service processor 140 enables self-encrypting drive capabilities associated with data storage device 122 to be retrieved from data storage device 122 and transmitted to BMC REG A 254 and/or BMC REG B 256. A determination is made as to whether data storage device 122 is a self-encrypting drive or non-self-encrypting drive. In response to data storage device 122 being a self-encrypting capable data storage device, security content (second security content) is retrieved from data storage device 122. BMC 255 compares the first security content, previously received from service processor 140, against/with the second security content received from data storage device 122 in order to validate an association between the first security content and the second security content. In response to a validation of the association (e.g. the first security content corresponds and/or matches the second security content) between the first security content and the second security content, one or more security keys associated with data storage device 122 are transmitted to data storage device 122 via GPIO 258. The one or more security keys enable (unlock) and/or disable (lock) access to data storage device 122.

In another embodiment, in response to data storage device 122 not being a self-encrypting capable data storage device, service processor 140 prevents an exchange of self-encrypting data, in response to the data storage device not being a self-encrypting capable data storage device.

Figure 3:
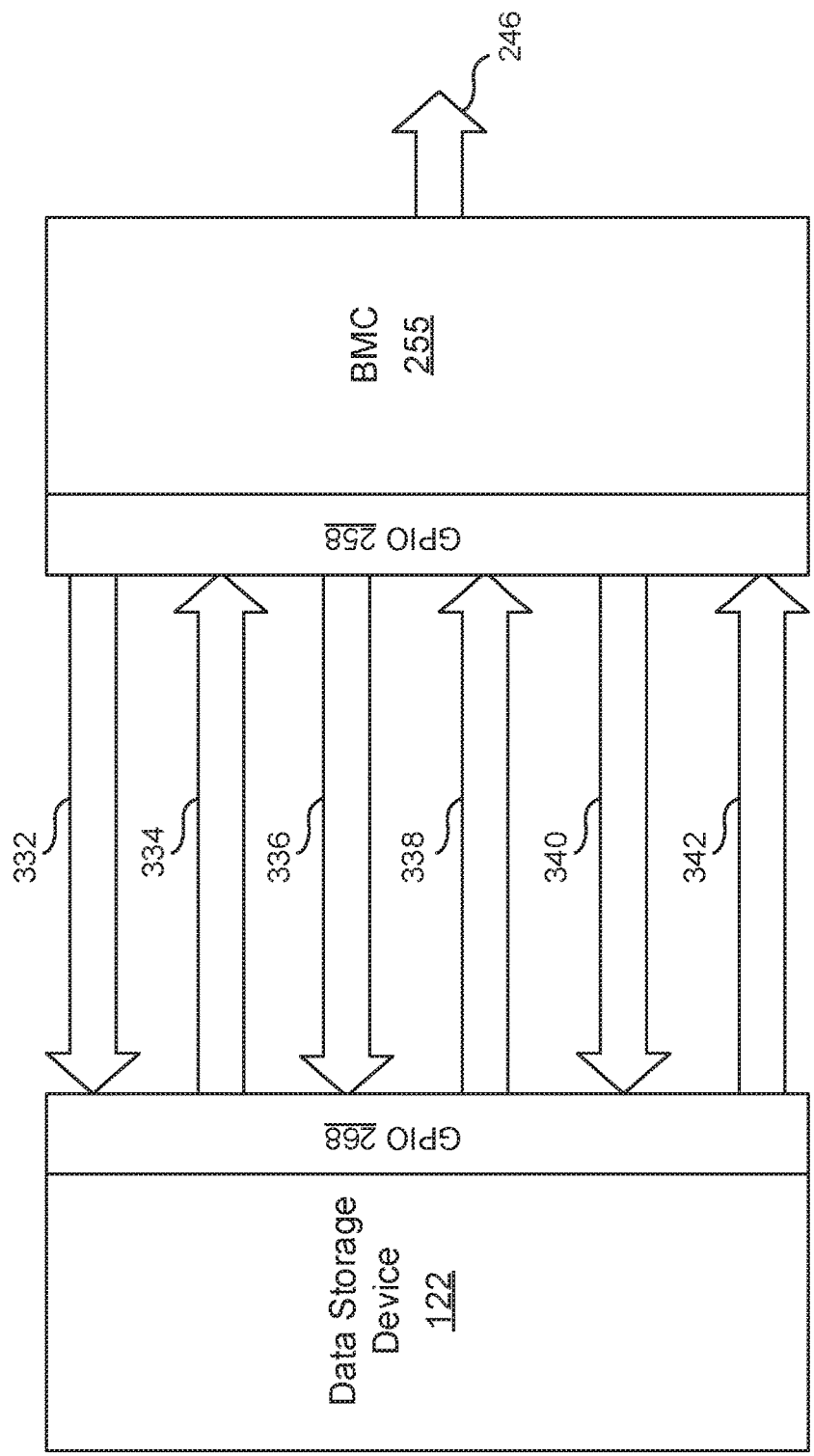
FIG. 3 illustrates a data storage device interface in communication with a backplane controller interface, in accordance with one embodiment.

FIG. 3 illustrates a data storage device interface in communication with a backplane controller interface. Data storage device 122 is communicatively coupled to a security device interface, GPIO 268. Backplane microcontroller (BMC) 255 is communicatively coupled to a backplane controller interface, GPIO 258. GPIO 258 and GPIO 268 enable communication between data storage device 122 and BMC 255 For example, communication and/or data transfer between data storage device 122 and BMC 255 may include: SED capability query 332, SED capability response 334, request for security content 336, data storage device security content 338, security key(s) 340, and data storage device response 342. I2C bus 246 enables communication and data transmission between the service processor and BMC 255.

In one embodiment, a backplane controller interface is detected, and in response to detecting the backplane controller interface, security content is retrieved from data storage device 122. The information and/or data transmissions between BMC 255 and data storage 122 are via GPIO 258 and GPIO 268, respectively. BMC 255 transmits SED capability query 332 to data storage device 122, to identify the SED capabilities of data storage device 122. BMC 255 receives SED capability response 334 from data storage device 122. In one embodiment data storage device 122 is self-encrypting capable data storage device. When data storage device 122 is a self-encrypting capable data storage device, BMC 255 transmits request for security content 336 to data storage device 122. Data storage device security content 338 is transmitted to BMC 255. When data storage device security content 338 is a match (or forms a lock and key association) with first security content within the registers of BMC 255, BMC 255 transmits security keys 340 to data storage device 122. Access is thus enabled to data within data storage device 122. BMC 255 receives data storage device response 342, which may include data from the unlocked data storage device.

In another embodiment, data storage device 122 is a non-self-encrypting capable data storage device. When data storage device is non-self-encrypting capable, transmission of secure data is prevented. BMC 255 informs service processor 140, via conduit 246, of the non-self-encrypting capabilities of data storage device 122. Service processor 140 may execute policy to automatically generate security content and/or security keys to secure data storage device 122 or query a user to initiate steps for securing data storage device 122.

In another embodiment when data storage device security content 338 is not a match (or does not form a lock and key association) with the first security content within the registers of BMC 255, BMC 255 informs service processor 140 via conduit 246. Service processor 140 may execute policy that enables automatic and/or user defined rekeying of data storage device 122.

Figure 4:
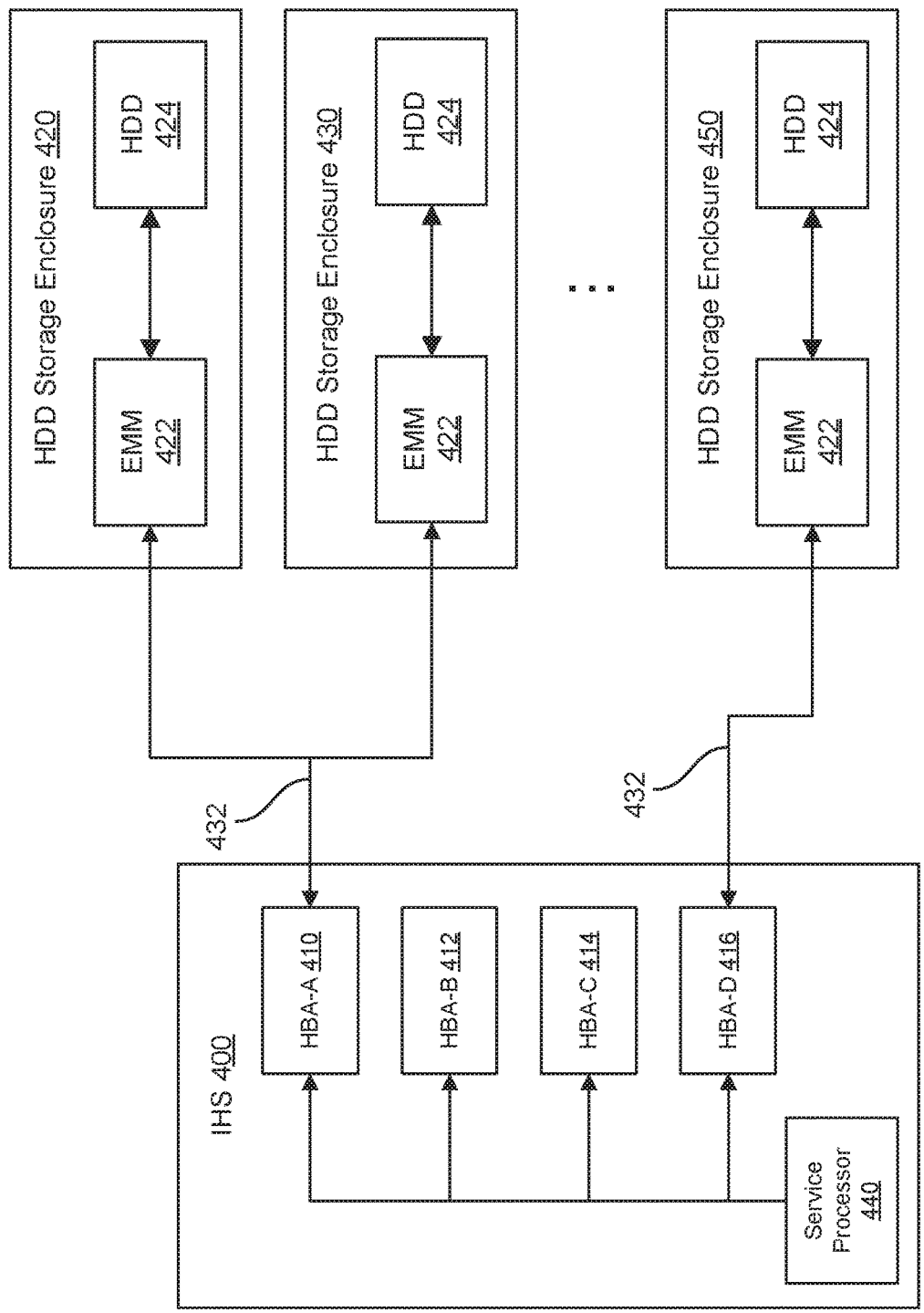
FIG. 4 illustrates a data storage device interface in communication with a host bus adapter interface, in accordance with one embodiment.

FIG. 4 illustrates a data storage device interface in communication with a host bus adapter interface. IHS 400 includes service processor 440 in communication with host bus adapter (HBA) A 410, HBA B 412, HBA C 414, and HBA D 416. One or more HBAs may be communicatively coupled to one or more hard disk drive (HDD) storage, such as HDD storage 420, 430, or 450. HDD storage enclosures 420, 430, and 450 include enclosure management module (EMM) 422 communicatively coupled to hard disk drive 424.

In one embodiment, a host bus adapter is dynamically detected. In response to detection of a host bust adapter, such as one of HBA A 410 through HBA D 416, first security content associated with a storage device is transmitted from service processor 440 to EMM 422. The first security content transmitted from service processor 440 to EMM 422 via HBA A 410 is compared to second security content within EMM 422 to determine whether the first security content and second security content match (i.e. have a valid lock and key association). In response to receiving a security content validation, one or more security keys are transmitted from HBA A 410 to EMM 422, thereby enabling EMM 422 to apply one or more security keys to unlock HDD 424. In response to receiving a security content non-validation, service processor 440 generates a query to assign a new security content to HDD 424 and/or HDD storage enclosure 420.

Figure 5A:
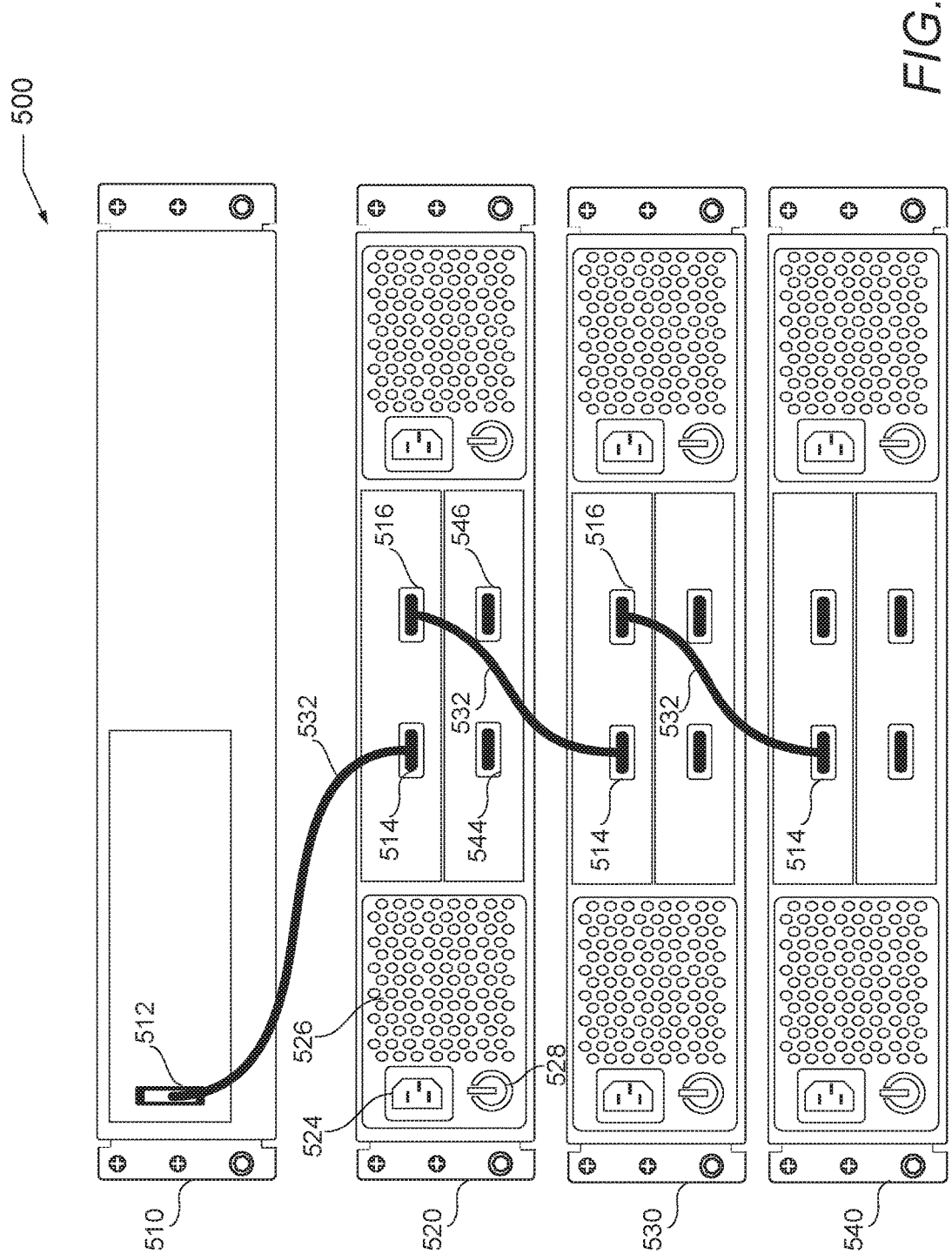
FIG. 5A illustrates an information handling system communicatively coupled to one or more storage devices, in accordance with one embodiment.

FIG. 5A illustrates an information handling system communicatively coupled to one or more storage devices. Server system 500 may have a configuration similar to IHS 100 and includes host controller 510. Host controller 510 includes HBA interface 512. HBA 512 is communicatively coupled to one or more HDD storage enclosures, for example, HDD 520, HDD 530, and HDD 540, via communication conduit 532. HDD 520 includes power input 524, power indicator 528, heat vent 526, HDD interface 514, HDD interface 516, HDD interface 544, and HDD interface 546. HDD 530 and HDD 540 are similarly configured as HDD 520. HDDs 520-540 each include HDD interface 514, HDD interface 516, HDD interface 544, and HDD interface 546, which are communicatively coupled to an enclosure management module, for example EMM 422.

In one embodiment, server system 500 includes host controller 510 with a single HBA interface, HBA interface 512. In response to detection of the host bus adapter interface, data transmission is enabled from host bus adapter interface 512 to one or more data storage devices (HDD 520-HDD 540). Data being transmitted may include, but is not limited to: first security content, second security content, and one or more associated security keys when the first security content is validated by the second security content. The transmission of security content, security keys, and/or data is achieved via communication conduit 532, which can be a serial attached small computer system interface and serial management protocol (SCSI/SMP) conduit. SCSI/SMP enables communicative coupling between host controller 510 and one or more HDDs, for example HDD 520-HDD 540.

FIG. 5B illustrates an information handling system with one or more host bus adapter interfaces communicatively coupled to a storage device, according to another embodiment. Server system 550 includes host controller 510, which may have a configuration similar to IHS 100. Host controller 510 includes HBA interface 512 and HBA interface 572. HDD 520 includes power input 524, power indicator 528, heat vent 526, HDD interface 514, HDD interface 516, HDD interface 544, and HDD interface 546. HBA 512 is communicatively coupled to HDD interface 514 of HDD 520. HBA 572 is communicatively coupled to HDD interface 544, of HDD 520, via communication conduit 532. HDD interface 514, HDD interface 516, HDD interface 544, and HDD interface 546 of HDD 520 are each communicatively coupled to an enclosure management module, for example EMM 422.

In one embodiment, server system 550 includes host controller 510 with a dual HBA interface, HBA interface 512 and HBA interface 572. In response to detection of the host bus adapter interface, data transmission is enabled for one or more of HBA interface 512 and HBA interface 572 to data storage devices HDD 520. In one embodiment, security content specific to the requesting HBA interface is required for securing and/or requesting data to be unlocked. In another embodiment, the same security content is required for HBA interface 512 and HBA interface 572 to access data associated with HDD 520.

FIG. 5C illustrates one or more information handling systems communicatively coupled to a storage device, according to another embodiment. Server system 560 includes host controller 510 and host controller 580, each controller may have a configuration similar to IHS 100. Host controller 510 includes HBA interface 512, and host controller 580 includes HBA interface 582. HDD 520 includes power input 524, power indicator 528, heat vent 526, HDD interface 514, HDD interface 516, HDD interface 544, and HDD interface 546. HBA 512 is communicatively coupled to HDD interface 514 of HDD 520. HBA 582 is communicatively coupled to HDD interface 544 of HDD 520, via communication conduit 532. HDD interface 514, HDD interface 516, HDD interface 544, and HDD interface 546 of HDD 520 are each communicatively coupled to an enclosure management module, for example EMM 422.

FIGS. 6 through 9 illustrate flowcharts of exemplary methods 600, 700, 800, and 900 by which service processor 140 within the preceding figures performs different aspects of the processes that enable the one or more embodiments of the disclosure. Generally, methods 600, 700, 800, and 900 represent computer-implemented methods for local key management of storage devices. The description of methods 600, 700, 800, and 900 are provided with general reference to the specific components illustrated within the preceding FIGS. 1-5. Generally, methods 600, 700, 800, and 900 are described as being implemented via processor 105 and particularly the execution of code provided by LKM 142 and/or SMM 144 acting within service processor 140. It is however appreciated that certain aspects of the described methods may be implemented via other processing devices and/or execution of other code, for example BMC 255 and EMM 422.

More specifically, the following flowcharts of FIGS. 6, 7, 8, and 9 disclose specific functionality provided by security manager module 144. According to one embodiment, security manager module 144 includes program code that respectively configures service processor 140 and/or processor 105 to provide the various functions described within the present disclosure.

Figure 6:
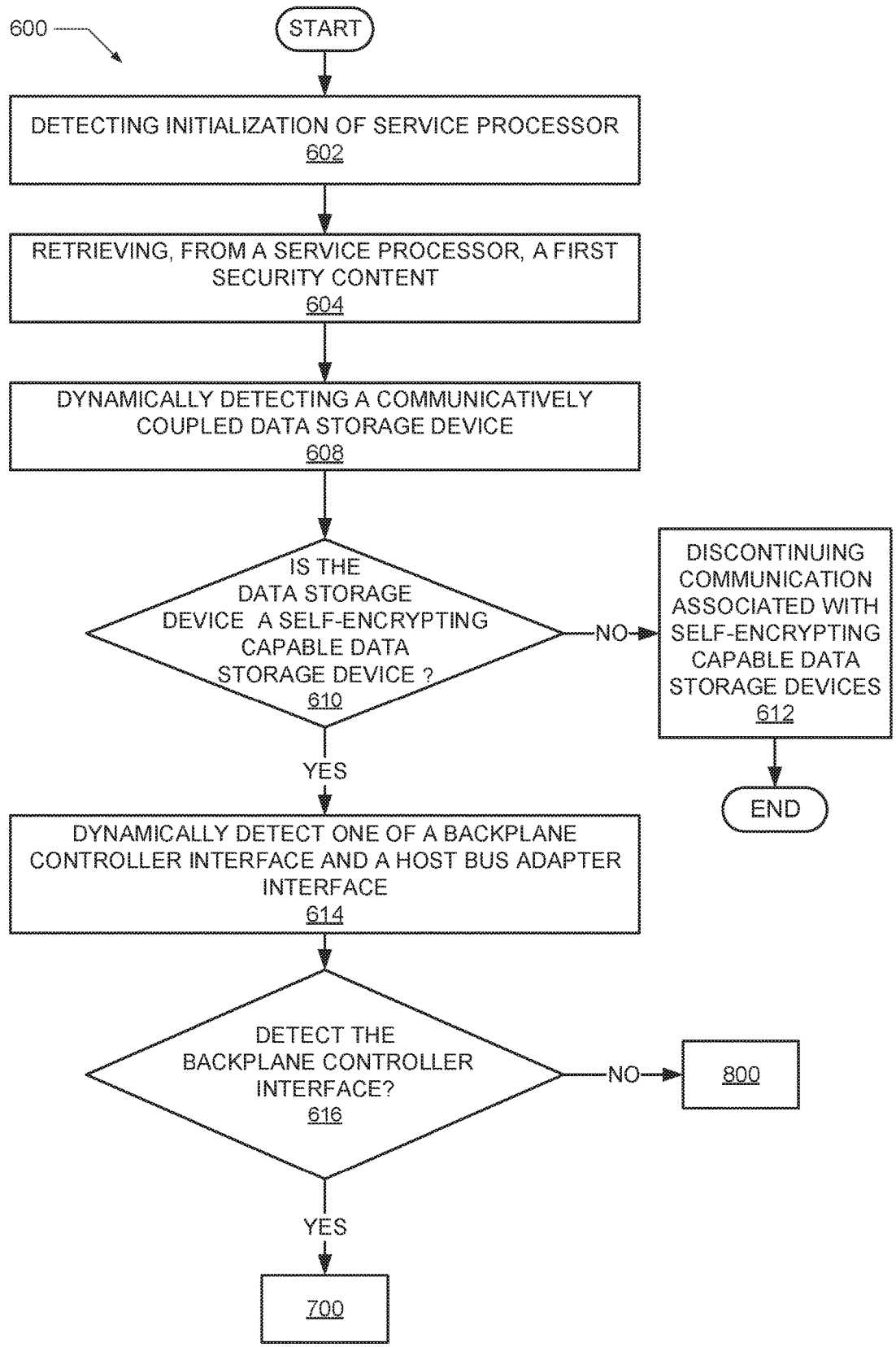
FIG. 6 is a flow chart illustrating an example of a method for determining an interface for communicating with a storage device, in accordance with one or more embodiments.

Referring now to the flow charts and specifically to FIG. 6, method 600 begins at the start block and proceeds to block 602 where method 600 includes detecting initialization of the service processor. Method 600 proceeds to block 604, where in response to detecting initialization of the service processor, a first security content is retrieved from the service processor. At block 608, the method includes dynamically detecting a communicatively coupled data storage device. Then, method includes querying to determine whether the detected data storage device is a self-encrypting capable data storage device, at block 610. In response to the data storage device being a self-encrypting capable data storage device, the method proceeds to block 614. At block 614 one of a backplane controller interface and a host bus adapter interface are dynamically detected. The method includes determining, at block 616, whether a backplane controller interface is detected. In response to the backplane controller being detected, method 600 continues to method 700. In response to the backplane controller not being detected, method 600 continues to method 800. In response to the data storage device being a non-self-encrypting capable data storage device, the method proceeds to block 612. At block 612, the method includes continuing communication that is unassociated with the self-encrypting data.

Figure 7:
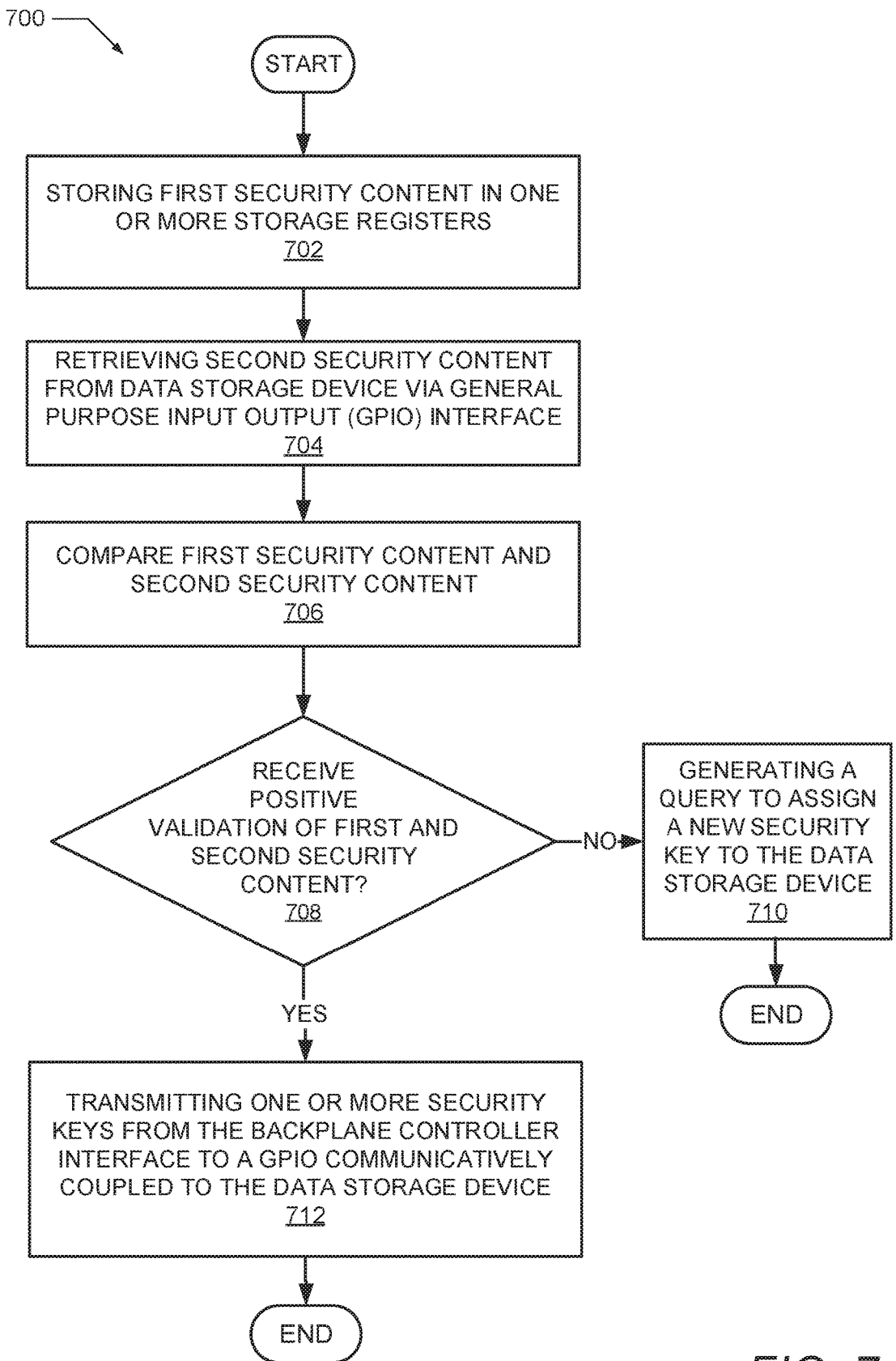
FIG. 7 is a flow chart illustrating an example of a method for local key management via general purpose input output (GPIO) interface, in accordance with one or more embodiments.

Turning now to FIG. 7, which illustrates a method for local key management via a general purpose input output (GPIO) interface. Method 700 begins at the start block and proceeds to block 702, where the method includes storing first security content in one or more storage registers. Then, second security content is retrieved from the detected data storage device via a general purpose input output interface (block 704). At block 706, method includes comparing the first security content and the second security content. A determination is made at block 706 as to whether there is a positive validation between first security content and second security content. In response to a positive validation, method transmits one or more security keys from the GPIO communicatively coupled to the backplane controller, to a GPIO communicatively coupled to the data storage device (block 712). In response to not receiving a positive validation, method generates a query to assign a new security key to the data storage device, at block 710. Method 700 concludes at the end block.

Figure 8:
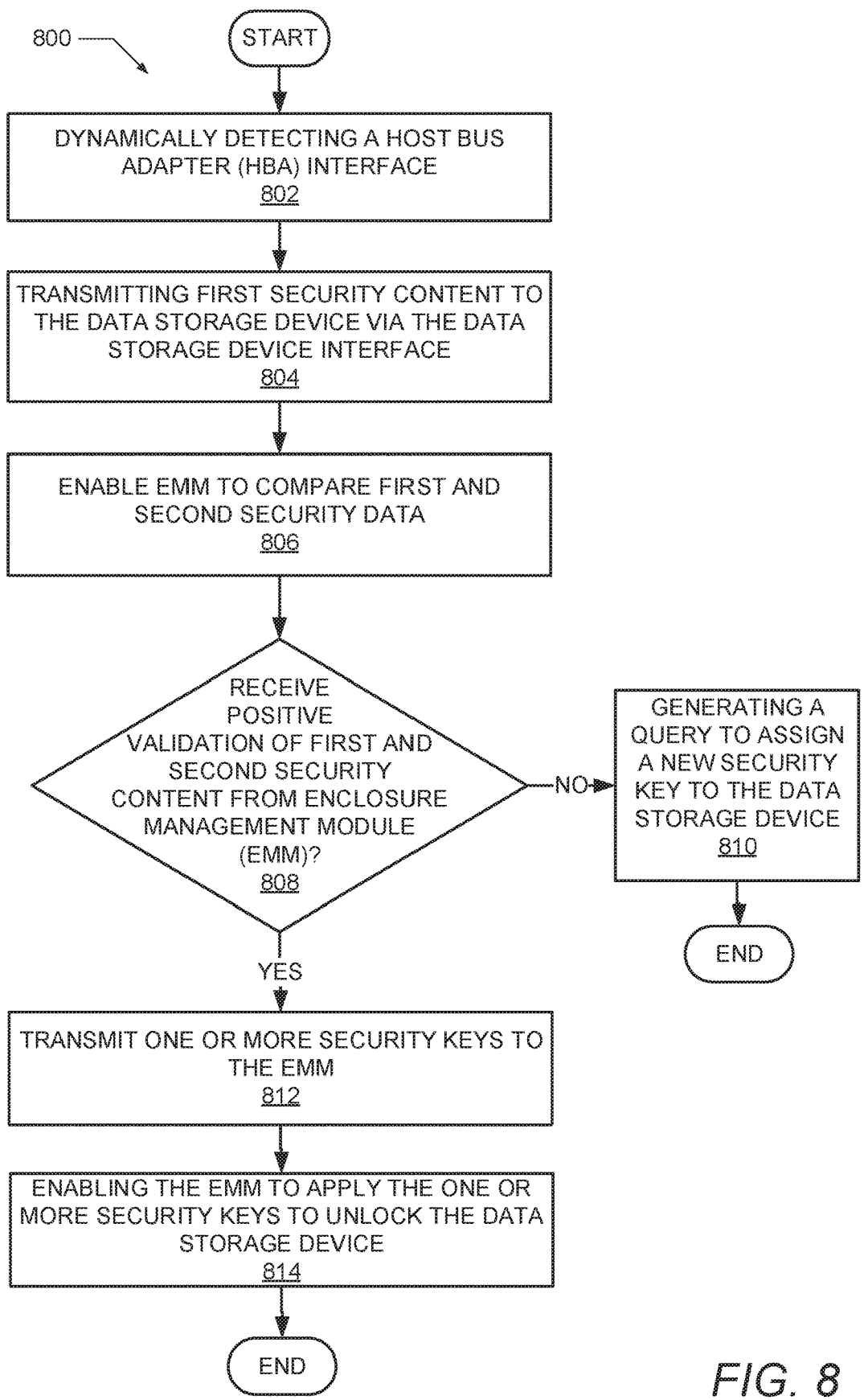
FIG. 8 is a flow chart illustrating an example of a method for local key management via host bus adapter interface, in accordance with one or more embodiments.

The flow chart of FIG. 8 describes a method for local key management via a host bus adapter interface. Method 800 begins at the start block and proceeds to block 802, where the method includes dynamically detecting a host bus adapter interface (410 of FIG. 4). First security content is transmitted from the service processor to the data storage device via the data storage device interface, at block 804. The method proceeds to block 806, where the service processor enables the enclosure management module (422 of FIG. 4) associated with the storage device to compare the first and second security content. At block 808, a determination is made as to whether a positive validation is received from the enclosure management module. In response to a positive validation, the service processor transmits one or more security keys to the enclosure management module (block 812). At block 814, method 800 includes enabling the EMM to apply the one or more security keys to unlock the data storage device. In response to not receiving a positive validation, at block 808, method 800 includes generating a query to assign a new security key to the data storage device at block 810. Method 800 concludes at the end block.

Figure 9:
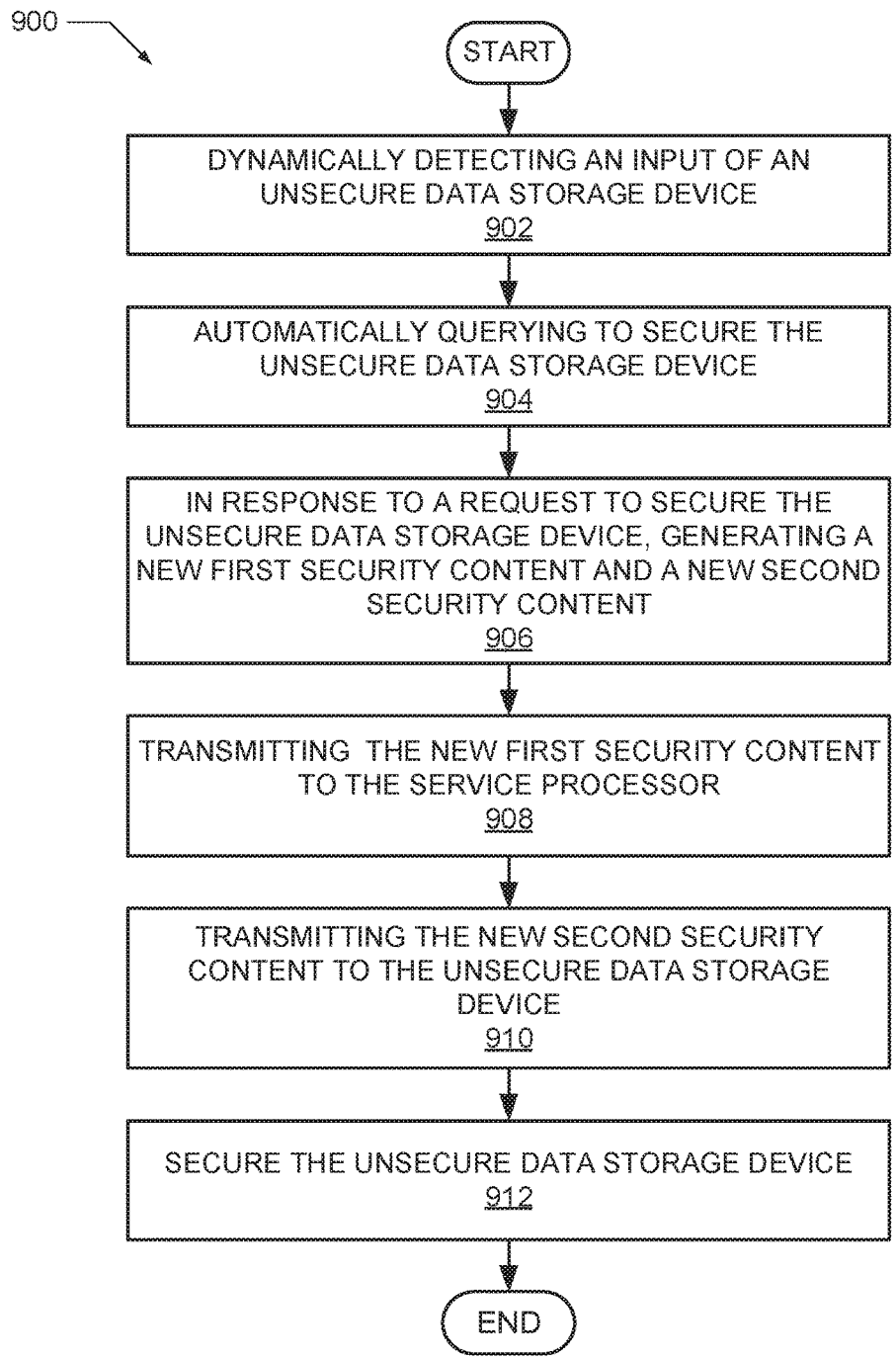
FIG. 9 is a flow chart illustrating an example of a method for securing the data of a hot-plugged storage device, in accordance with one or more embodiments.

Turning now FIG. 9, there is presented a method for securing the data of a hot-plugged storage device. Method 900 begins at the start block and proceeds to block 902, where the method includes dynamically detecting an input of an unsecure data storage device. Method continues to block 904 where method queries to determine whether the unsecure data storage should be automatically secured. At bock 906, in response to a request to secure the unsecure data storage device, a new first security content and a new second security content are generated. Method 900 includes transmitting the new first security content to the service processor, at block 908. Method 900 further includes transmitting the new second security content to the unsecure data storage device at block 910. At block 912, method 900 enables service processor 140 to secure the unsecure data storage device. The process concludes at the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed:

1. A method in an information handling system (IHS) for local key management of storage enclosures, the method comprising:
   retrieving a first security content from a security vault of a service processor;
   dynamically detecting an interface, from among a backplane controller interface and a host bus adapter interface, communicatively coupled to the service processor;
   dynamically detecting a data storage device communicatively coupled to the detected interface;
   in response to detecting the data storage device, determining whether the data storage device is a self-encrypting capable data storage device, wherein the data storage device can be one of a self-encrypting capable data storage device and a non-self-encrypting data storage device;
   in response to the data storage device not being a self-encrypting capable data storage device, enabling transmission of only non-encrypted data to and from the data storage device;
   in response to the data storage device being a self-encrypting capable data storage device, retrieving a second security content;
   validating an association between the first security content and the second security content;
   in response to validating the association between the first security content and the second security content: transmitting one or more security keys to the data storage device via the detected one of the backplane controller interface and the host bus adapter interface; and
   enabling access to the data storage device.

2. The method of claim 1, further comprising:
   in response to detecting the backplane controller interface, storing the first security content in one or more storage registers, wherein the one or more storage registers are within a microcontroller communicatively coupled to the backplane controller interface.

3. The method of claim 1, wherein retrieving the second security content further comprises:
   in response to detecting the backplane controller interface, retrieving the second security content from the self-encrypting capable data storage device, wherein the backplane controller interface is a first general purpose input output (GPIO) interface, and wherein an interface associated with the self-encrypting capable data storage device is a next GPIO interface.

4. The method of claim 3, further comprising: in response to validating the association between the first security content and the second security content, transmitting the one or more security keys from the first GPIO interface to the next GPIO interface.

5. The method of claim 1, wherein retrieving the second security content further comprises:
   in response to detection of the host bus adapter interface, transmitting the second security content to an enclosure management module, wherein the enclosure management module is communicatively coupled to the self-encrypting capable data storage device.

6. The method of claim 5, further comprising:
   receiving, from the enclosure management module, one of a security content validation and a security content non-validation;
   in response to receiving a security content validation:
      transmitting one or more security keys from the host bus adapter interface to the enclosure management module; and enabling the enclosure management module to apply the one or more security keys to unlock the data storage device; and in response to receiving a security content non-validation, generating a query to assign a new security content to the data storage device.

7. The method of claim 1, further comprising:

dynamically detecting an unsecure data storage device communicatively coupled to one of the backplane controller interface and the host bus adapter interface subsequent to the initialization of the service processor;

in response to detection of the unsecure data storage device, receiving a request at the service processor to secure the unsecure data storage device; and in response to receipt of the request to secure the unsecure data storage device:

generating a new first security content and a new second security content, wherein the new first security content is transmitted to the service processor, and the new second security content is transmitted to the unsecure data storage device; and securing the unsecure data storage device using the combination of the new first security content with the new second security content.

8. The method of claim 7, wherein dynamically detecting the unsecure data storage device communicatively coupled to one of the backplane controller interface and the host bus adapter interface subsequent to the initialization of the service processor further comprises:

receiving a command to automatically secure the unsecure data storage device; and in response to receipt of the command to secure the unsecure data storage device, automatically generating a security key, wherein when the security key is generated the security key is automatically applied to secure the unsecure data storage device.

9. The method of claim 1, further comprising:

in response to detection of the host bus adapter interface, enabling transmission, from the host bus adapter interface to the data storage device, of the first security content, second security content, and one or more associated security keys via serial attached small computer system interface and serial management protocol (SCSI/SMP).

10. An information handling system (IHS) comprising:

a processor;

a service processor;

a controller, communicatively coupled to a first device interface, including a first terminal for coupling to a data storage device and for transmitting one or more security keys to the data storage device; and a memory system communicatively coupled to the service processor and having thereon a security manager module that executes on the controller and configures the controller to:

retrieve a first security content from a security vault of the service processor;

dynamically detect one of a backplane controller interface and a host bus adapter interface communicatively coupled to the service processor;

dynamically detect a data storage device communicatively coupled to one of the backplane controller interface and host bus adapter interface;

in response to detection of the data storage device, dynamically determine whether the data storage device is a self-encrypting capable data storage device, wherein the data storage device can be one of a self-encrypting capable data storage device and a non-self-encrypting capable data storage device;

in response to the data storage device not being a self-encrypting capable data storage device, prevent an exchange of self-encrypting data;

in response to the data storage device being a self-encrypting capable data storage device, retrieve a second security content;

validate an association between the first security content and the second security content;

in response to validating the association between the first security content and the second security content, transmit one or more security keys to the data storage device via one of the backplane controller interface and the host bus adapter interface; and enable access to the data storage device.

11. The IHS of claim 10, wherein the security manager module further enables the controller to:

in response to detection of the backplane controller interface, store the first security content in one or more storage registers, wherein the one or more storage registers are within a microcontroller communicatively coupled to the backplane controller interface.

12. The IHS of claim 10, wherein to retrieve the second security content, the controller: in response to detection of the backplane controller interface, retrieves the second security content from the self-encrypting capable data storage device, wherein the backplane controller interface is a first general purpose input output (GPIO) interface, and wherein an interface associated with the self-encrypting capable data storage device is a next GPIO interface.

13. The IHS of claim 12, wherein the controller: in response to a positive validation of the association between the first security content and the second security content, transmits the one or more security keys from the first GPIO interface to the next GPIO interface.

14. The IHS of claim 10, wherein in response to the data storage device being a self-encrypting capable data storage device, following the controller retrieving the second security content, the controller further:

in response to detection of the host bus adapter interface, transmits the second security content to an enclosure management module, wherein the enclosure management module is communicatively coupled to the self-encrypting capable data storage device.

15. The IHS of claim 14, wherein the security manager module further enables the controller to:

receive, from the enclosure management module, one of: a security content validation and a security content non-validation;

in response to receipt of security content validation, transmit the one or more security keys from the host bus adapter interface to the enclosure management module;

enable the enclosure management module to apply the one or more security keys to unlock the data storage device; and in response to receipt of a security content non-validation, generate a query to assign a new security content to the data storage device.

16. The IHS of claim 10, wherein the security manager module further enables the controller to:

dynamically detect an unsecure data storage device communicatively coupled to one of the backplane controller interface and the host bus adapter interface subsequent to an initialization of the service processor;

in response to detection of the unsecure data storage device, receive a request at the service processor to secure the unsecure data storage device;

in response to receipt of a command to secure the unsecure data storage device, generate a new first security content and a new second security content, wherein the new first security content is transmitted to the service processor, and the new second security content is transmitted to the unsecure data storage device; and secure the unsecure data storage device using the combination of the new first security content with the new second security content.

17. The IHS of claim 16, wherein dynamic detection of the unsecure data storage device communicatively coupled to one of the backplane controller interface and the host bus adapter interface subsequent to the initialization of the service processor further enables the controller to:

receive a command to automatically secure the unsecure data storage device;

in response to receipt of the command to secure the unsecure data storage device, automatically generate a security key; and automatically apply the security key to secure the unsecure data storage device.

18. The IHS of claim 10, wherein the controller:

in response to detection of the host bus adapter interface, enables transmission, from the host bus adapter interface to the data storage device, of the first security content, second security content, and the one or more security keys via serial attached small computer system interface and serial management protocol (SCSI/SMP).

* * * * *